United States Patent Office 2,820,817
Patented Jan. 21, 1958

2,820,817

OXYGENATED INDAN COMPOUNDS AND METHOD OF MAKING THE SAME

Joseph Sam, Philadelphia, Pa., assignor to McNeil Laboratories, Inc., Philadelphia, Pa., a corporation of Pennsylvania No Drawing. Application February 4, 1954
Serial No. 408,298

6 Claims. (Cl. 260—490)

The present invention relates to novel chemical compounds and to the method of preparing the same; and, more particularly, the invention relates to oxygenated indan compounds possessing therapeutic, particularly hypotensive properties.

Many agents are known to produce a lowering of the blood pressure in a living body. Unfortunately, most of these substances possess such limitations and disadvantages as to render them practically unusable as specific therapeutic agents in the treatment and relief of hypertension. Thus, in many cases the hypotensive effect of these agents is only transitory, while others produce undesirable side effects on the system even at levels that are only partially effective hypotensively. Many of the agents cannot be administered orally since they have an irritating or corrosive effect on the stomach or intestinal wall, and even when administered parenterally, the results as far as relief from hypertension is concerned are erratic.

It is the principal object of the present invention to provide compounds possessing valuable hypotensive properties.

It is another object of the invention to provide compounds possessing hypotensive properties which may be administered at therapeutic levels orally as well as parenterally.

Other objects, including the provision of a novel method of making the compounds, will become apparent from a consideration of the following specification and the claims.

The compounds of the present invention are oxygenated indan compounds comprising the fundamental structural formula:

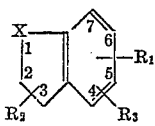

where $R_1$ is selected from the group consisting of aminoalkoxy, monoalkylaminoalkoxy, dialkylaminoalkoxy, dialkylaminoalkoxyalkyl and N-alkylpiperidyloxy groups, the alkyl and alkoxy groups of which contain from 1 to 4 carbon atoms; where $R_2$ is selected from the group consisting of hydrogen, halogen, phenyl and alkyl groups containing from 1 to 4 carbon atoms; where $R_3$ is selected from the group consisting of hydrogen, hydroxy, alkyl and alkoxy groups containing from 1 to 4 carbon atoms, and where X is selected from the group consisting of

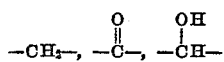

and

where $R_4$ is an alkyl group containing from 1 to 4 carbon atoms.

As stated, in the compounds $R_1$ may be selected from various amine-containing ether groups. It may be an aminoalkoxy group, —O—Alk—$NH_2$; a monoalkylaminoalkoxy group, —O—Alk—NH—R; a dialkylaminoalkoxy group, —O—Alk—$N(R)_2$; a dialkylaminoalkoxyalkyl group, —Alk—O—Alk—$N(R)_2$ or an N-alkylpiperidyloxy group

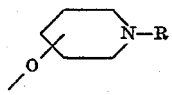

From the standpoint of optimum hypotensive activity, the compounds wherein $R_1$ is a dialkylaminoalkoxy group are preferred. The R groups set forth above will contain from 1 to 4 carbon atoms and may be methyl, ethyl, n-propyl, isopropyl, n-butyl, sec-butyl or tert-butyl groups. The term "Alk" in the foregoing discussions refers to alkylene group containing from 1 to 4 carbon atoms, such as methylene, ethylene, trimethylene, propylene, and the like. In the compounds which are preferred from the standpoint of optimum hypotensive activity the $R_1$ group is located at the six position on the molecule.

$R_2$ may be, as stated above, hydrogen, a halogen, such as chlorine, bromine, and the like, phenyl or an alkyl group containing from 1 to 4 carbon atoms such as those mentioned above in connection with $R_1$. In the preferred compounds of the invention, $R_2$ is either hydrogen or an alkyl group, particularly a methyl group. The exact position of $R_2$ on the molecule is not critical from the standpoint of the broader aspects of the invention, although it is preferably located at the two position.

$R_3$ may be hydrogen or an alkyl group containing from 1 to 4 carbon atoms such as those mentioned above in connection with $R_1$. $R_3$ may also be an alkoxy group containing from 1 to 4 carbon atoms such as methoxy, ethoxy, n-propoxy, iso-propoxy, n-butoxy, sec-butoxy and tert-butoxy. In the preferred compounds $R_3$ is hydrogen. The position of $R_3$ on the molecule may also vary from any of the positions in accordance with the broader aspects of the invention. However, in the preferred compounds, $R_3$, is located at the five position.

X may be varied somewhat to provide nuclei varying from the indan nucleus, where X is —$CH_2$—, to, when X is

and the other groups mentioned above, the indanone nucleus and derivatives thereof. In connection with the latter, X may be

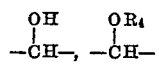

or

in which latter two cases, $R_4$ is an alkyl group containing from 1 to 4 carbon atoms such as those mentioned above in connection with $R_1$. In the preferred compounds X is either

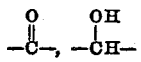

or

especially

In the compounds of the invention one equivalent of acid may be added to the nitrogen of the $R_1$ group to form a salt. Hence, the compounds of the invention may be prepared and/or employed either as the base or as a salt. In view of the fact that the salts differ from the bases only in the addition of the acid to the stated nitrogen atom and are characterized by the same fundamental structural formula, the salts as well as the bases are included within the scope of this specification and of the claims where reference is made to a compound comprising the stated fundamental structure.

The acid forming the salt may be any inorganic or organic acid desired, for example, hydrochloric, hydrobromic, hydriodic, nitric, sulfuric, phosphoric, and the like; acetic, propionic, caproic, stearic, and other acids of this series, and the like; crotonic, fumaric, oleic, oxalic, citric, tartaric, lactic, benzoic, naphthoic, picric, salicylic, dilituric, methane sulfonic, camphor sulfonic, and the like. If a salt is to be administered, any toxicity of other undesirable properties which may be imparted by the acid should be taken into consideration as well known in the art.

It will be seen from the foregoing that the compounds possessing optimum hypotensive properties and which are, therefore, the preferred compounds of the invention are those comprising the fundamental structural formula:

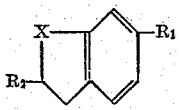

where $R_1$ is a dialkylaminoalkoxy group the alkyl and alkoxy groups of which contain from 1 to 4 carbon atoms; where $R_2$ is selected from the group consisting of hydrogen and alkyl groups containing from 1 to 4 carbon atoms, particularly the group consisting of hydrogen and methyl, and where X is selected from the group consisting of

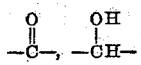

and

where $R_4$ is an alkyl group consisting of from 1 to 4 carbon atoms, particularly

The compounds may be readily prepared by condensing one mol of an appropriate hydroxy indan or indan derivative providing the desired X, $R_2$ (except halogen) and $R_3$ groups, with one mol of the appropriate amino-, alkyl substituted amino-, or alkyl substituted amino-alkyl halide or N-alkylpiperidyl halide providing the desired $R_1$ group. The reaction may be conducted in an aqueous or non-aqueous medium, such as a mixture of water and methanol or an anhydrous mixture of methyl alcohol and benzene, in the presence of a base, such as sodium hydroxide, sodium methoxide, potassium ethoxide, and the like. The temperature conditions may vary widely; however, it is preferable to employ an elevated temperature at or near the boiling point in order to hasten the reaction. In this connection, carrying out the reaction under reflux at atmospheric conditions is particularly advantageous, and under these conditions the reaction is completed in from one to a few hours.

In recovering the product, the solvent may be distilled off or the compound precipitated as a salt by the addition of an acid, such as hydrogen chloride, to the mixture. When the reaction medium is a mixture of methyl alcohol and benzene it is desirable to add water to the mixture recovering the product from the benzene layer. The product, if in the form of the base, may be purified by distilling either under vacuum or atmospheric conditions.

If the product is recovered in salt form it may be purified by recrystallization from, for example, methyl ethyl ketone or a mixture of ether and methyl alcohol.

The foregoing reactions are suitable in the situations where $R_2$ is other than halogen. Where $R_2$ in the final compound is to be halogen, the halogen is added to the compound prepared as described above as by reacting the compound with the desired halogen in non-aqueous medium, such as an anhydrous mixture of methanol and ether.

An alternative procedure for preparing compounds in which X is

involves reduction of the corresponding indanone as by hydrogenation under pressure in the presence of a palladium carbon catalyst. Likewise, the products in the form of the indanol can be readily converted into the corresponding indanyl esters by reaction with the appropriate acid halides.

The hydroxy indan or indan derivatives for the most part for use in the above-described reactions may readily be prepared by demethylation of the corresponding methoxy derivative as by refluxing the methoxy derivative in benzene in the presence of aluminum bromide. In the case where $R_3$ in the final compound is to be an alkoxy group, the hydroxy indanone compound may be prepared by cyclization of the corresponding acid, followed by reduction to the corresponding indanol or indan.

The compounds of the present invention and their preparation may be better understood from a consideration of the following examples which are given for the purpose of illustration only and are not to be considered as limiting the scope of the invention in any way.

*Example I*

A mixture of 6 g. of 6-methoxy-1-indanone, 32 g. of aluminum bromide and 200 ml. of dry thiophene-free benzene is refluxed for four and one-half hours. The resulting mixture is cooled and decomposed with ice and hydrochloric acid. The benzene layer is separated and the acid layer extracted with ether. The extracts are combnied and dried over anhydrous sodium sulfate. The ether is removed under vacuum, and the crude product recrystallized from ethanol. The resulting 6-hydroxy-1-indanone melts at 151–153° C.

To a solution of sodium methoxide prepared from 0.3 g. of sodium and 25 ml. of methanol is added 1.48 g. (0.01 mol) of 6-hydroxy-1-indanone and 1.36 g. (0.01 mol) of diethylaminoethyl chloride, and the mixture is refluxed for one and one-half hours. The methanol is removed under vacuum, water is added, and the resulting mixture is extracted with ether. After drying a short period over anhydrous potassium carbonate, the ether is removed and the product further dried in a vacuum oven. The product is then dissolved in 100 ml. of dry ether and hydrogen chloride is introduced. The resulting hydrochloride is removed by filtration and is recrystallized from a mixture of methanol and ether. The resulting 6-(2-diethylaminoethoxy)-1-indanone hydrochloride melts at 183–184° C. The calculated N content for $$C_{15}H_{22}ClNO_2$$

is 4.9; that found was 4.9.

8 milligrams of the product per kilogram of body weight reduces the blood pressure substantially.

*Example II*

Following the procedure of Example I, using, however, 3 g. (0.03 mol) of crude β-dimethylaminoethyl chloride in place of the diethylaminoethyl chloride results in 6-(2-dimethylaminoethoxy) - 1 - indanone hydrochloride melting at 210–211° C. The calculated N content for $C_{13}H_{18}ClNO_2$ is 5.5; that found is 5.4.

Following the same procedure but using β-dipropylaminoethyl chloride, β-diisopropylaminoethyl chloride, β-dibutylaminoethylchloride and β-diisobutylaminoethyl chloride in place of dimethylaminoethyl chloride, the corresponding 6-(β-dipropylaminoethoxy)-1-indanone, 6-(β-diisopropylaminoethoxy)-1-indanone, 6-(β-dibutylaminoethoxy)-1-indanone and 6-(β-diisobutylaminoethoxy)-1-indanone respectively are prepared.

Example III

Following the procedure of Example I, using, however, 1.6 g. of 6-hydroxy-2-methyl-1-indanone in place of the 6-hydroxy-1-indanone results in 6-(2-diethylaminoethoxy)-2-methyl-1-indanone hydrochloride melting at 177–179° C. The calculated N content for $C_{16}H_{24}ClNO_2$ is 4.7; that found is 4.5 ±0.1.

2 milligrams of this compound per kilogram of body weight reduces the blood pressure substantially.

Example IV

Following the procedure of Example I, using, however, 1.3 g. of 6-hydroxy-2-methyl-1-indanone and 1 g. β-dimethylaminoethyl chloride results in 6-(2-dimethylaminoethoxy)-2-methyl-1-indanone hydrochloride melting at 200–202° C. The calculated N content for $C_{14}H_{20}ClNO_2$ is 5.2; that found is 5.1.

Only 4 milligrams of this compound per kilogram of body weight reduces the blood pressure substantially.

Example V

To a solution of sodium methoxide prepared from 1.2 g. (0.05 mol) sodium and 50 ml. methanol is added 8.1 g. (0.05 mol) of 6-hydroxy-2-methyl-1-indanone and 7.4 g. (0.05 mol) of 3-chloro-1-ethylpiperidine. After refluxing for six hours, the mixture is cooled and the precipitated sodium chloride removed by filtration. The filtrate is concentrated under vacuum and diluted with water. The aqueous mixture is extracted with ether and the combined extracts dried over anhydrous sodium sulfate. Passage of hydrogen chloride into an ether solution of the product followed by recrystallizations from a mixture of methanol and ether gives 1-ethyl-3-(1-oxo-2-methyl-6-indanoxy) piperidine hydrochloride melting at 199–201° C. The calculated N content for $C_{17}H_{24}ClNO_2$ is 4.5; that found is 4.6±0.1.

4 milligrams of the compound per kilogram of body weight reduces the blood pressure significantly.

Example VI

Following the procedure of Example V using, however, 3 g. of 6-hydroxy-1-indanone and 3.2 g. of 3-chloro-1-ethylpiperidine and a mixture of acetone, methanol and ether during the recrystallizations results in 1-ethyl-3-(1-oxo-6-indanoxy) piperidine hydrochloride melting at 198–200° C. The calculated N content for $C_{16}H_{22}ClNO_2$ is 4.7; that found is 4.5.

About 8 milligrams of the compound per kilogram of body weight reduces the blood pressure significantly.

By using 6-hydroxy-2-ethyl-1-indanone, 6-hydroxy-2-propyl-1-indanone, 6-hydroxy-2-isopropyl-1-indanone, 6-hydroxy-2-butyl-1-indanone and 6-hydroxy-2-isobutyl-1-indanone in place of 6-hydroxy-1-indanone there results 1-ethyl-3-(1-oxo-2-ethyl-6-indanoxy) piperidine, 1-ethyl-3-(1-oxo-2-propyl-6-indanoxy) piperidine, 1-ethyl-3-(1-oxo-2-isopropyl-6-indanoxy) piperidine, 1-ethyl-3-(1-oxo-2-butyl-6-indanoxy) piperidine and 1-ethyl-3-(1-oxo-2-isobutyl-6-indanoxy) piperidine, respectively.

Example VII

A solution of 7 g. (0.026 mol) of 6-(β-dimethylaminoethoxy)-2-methyl-1-indanone hydrochloride of Example IV in 100 ml. of water is subjected to hydrogenation at 58.8 p. s. i. in the presence of palladium-carbon catalyst. Reduction is allowed to take place over a period of 18 hours. The catalyst is removed by filtration and the solvent removed by evaporation under vacuum. The residue is recrystallized from methyl ethyl ketone containing a few drops of methanol to provide 6-(β-dimethylaminoethoxy)-2-methyl-1-indanol hydrochloride melting at 136–137° C. The calculated N content for $C_{14}H_{22}ClNO_2$ is 5.2; that found is 5.1.

In a similar manner using, however, the indanones described in Examples I, II, III, V, VI, IX, XI, XII, XIII, XIV, XV, XVI, XVII, XX and XXII in place of 6-(β-dimethylaminoethoxy)-2-methyl-1-indanone, the corresponding 6-(2-diethylaminoethoxy)-1-indanol, 6-(2-dimethylaminoethoxy) - 1 - indanol, 6-(2-diethylaminoethoxy)-2-methyl-1-indanol 1-ethyl-3-(1-hydroxy-2-methyl-6-indanoxy) piperidine, 1-ethyl-3-(1-hydroxy-6-indanoxy) piperidine, 6-(2-dimethylaminoethoxy)-2-ethyl-1-indanol, 2 - bromo - 6 - (2 - dimethylaminoethoxy) - 1 - indanol, 6-(2 - diethylaminoethoxy) - 5 - methoxy - 1 - indanol, 5-(2-dimethylaminoethoxy - 1 - indanol, 6 - (2 - dimethylaminoisopropoxy) - 2 - methyl - 1 - indanol, 7 - (2 - diethylaminoethoxy) - 4 - methyl - 1 - indanol, 6 - (2 - diethylaminoethoxy) - 2 - phenyl - 1 - indanol, 6 - (2 - ethylaminoethoxy) - 2 - methyl - 1 - indanol, 6 - (2 - aminoethoxy) - 2 - methyl - 1 - indanol, 5 - (2 - diethylaminoethoxy) - 4 - hydroxy - 1 - indanol are prepared.

8 milligrams of the compound per kilogram of body weight reduces the blood pressure substantially.

Example VIII

A solution of 2.5 g. (0.01 mol) of crude 6-(β-dimethylaminoethoxy)-2-methyl-1-indanol in 50 ml. of dry benzene is treated with 1.3 g. of isobutyryl chloride, and the resulting solution is refluxed in a water bath for one and one-half hours. The precipitate is removed by filtration and recrystallized from methyl ethyl ketone providing 6-(β-dimethylaminoethoxy) - 2 - methyl - 1 - indanyl isobutyrate hydrochloride melting at 174–175° C. The calculated N content for $C_{18}H_{28}ClNO_3$ is 4.1; that found is 4.2.

2 milligrams of this compound per kilogram of body weight reduces the blood pressure substantially.

By using acetyl chloride, propionyl chloride and butyryl chloride in place of isobutyryl chloride, the corresponding 6 - (β - dimethylaminoethoxy) - 2 - methyl - 1 - indanyl acetate, 6 - (β - dimethylaminoethoxy) - 2 - methyl - 1 - indanyl propionate and 6 - (β - dimethylaminoethoxy) - 2-methyl-1-indanyl butyrate are prepared.

Example IX

Following the procedure of Example I, using, however, 2 - ethyl - 6 - hydroxy - 1 - indanone and β - dimethylaminoethyl chloride, 6 - (β - dimethylaminoethoxy) - 2 - ethyl-1-indanone is produced. The product is dissolved in ether and treated with hydrogen chloride. The resulting precipitate is removed by filtration and recrystallized from methyl ethyl ketone to provide 6 - (β - dimethylaminoethoxy)-2-ethyl-1-indanone hydrochloride melting at 169–170° C. The calculated N content for $C_{15}H_{22}ClNO_2$ is 4.9; that found is 5.0.

In the same manner by replacing 2-ethyl-6-hydroxy-1-indanone with 2-propyl-6-hydroxy-1-indanone, 2-isopropyl-6-hydroxy-1-indanone, 2-butyl-6-hydroxy-1-indanone and 2-isobutyl-6-hydroxy-1-indanone, the corresponding 6-(β-dimethylaminoethoxy) - 2 - propyl - 1 - indanone, 6 - (β - dimethylaminoethoxy) - 2 - isopropyl - 1 -indanone, 6 - (β-dimethylaminoethoxy) - 2 - butyl - 1 - indanone and 6 - (β-dimethylaminoethoxy) - 2 - isobutyl - 1 - indanone, respectively, are prepared.

Example X

Following the procedure of Example I using 2-methyl-5-indanol and β-dimethylaminoethyl chloride provides 5-(β-dimethylaminoethoxy)-2-methylindan. The product is dissolved in ether and treated with hydrogen chloride. The resulting precipitate is removed by filtration and recrystallized from methyl ethyl ketone to provide 5-(β-dimethylaminoethoxy)-2-methylindan hydrochloride melting at 158–159° C. The calculated N content for $C_{14}H_{22}ClNO$ is 5.5; that found is 5.3.

8 milligrams of this compound per kilogram of body weight reduces the blood pressure substantially.

In the same manner using, however, 2-propyl-5-indanol, 2-isopropyl-5-indanol, 2-butyl-5-indanol and 2-sec-butyl-5-indanol in place of 2-methyl-5-indanol, the corresponding 5-($\beta$-dimethylaminoethoxy)-2-propylindan, 5-($\beta$-dimethylaminoethoxy) - 2 - isopropylindan, 5-($\beta$-dimethylaminoethoxy) - 2 - butylindan and 5-($\beta$-dimethylaminoethoxy)-2-sec-butylindan are prepared.

*Example XI*

To a solution of 4.7 g. of 6-($\beta$-dimethylaminoethoxy)-1-indanone in 200 ml. of ether and 200 ml. of ethanol is added with stirring 1.5 ml. of bromine. The mixture is stirred for an additional two hours and then allowed to stand overnight at room temperature. The solvent is removed by evaporation and the residue recrystallized from methyl ethyl ketone containing a few drops of methanol to provide 2 - bromo - 6 - ($\beta$ - dimethylaminoethoxy)-1-indanone hydrobromide melting at 175–177° C. The calculated N content for $C_{13}H_{17}Br_2NO_2$ is 3.7; that found is 3.8.

1 milligram of this compound per kilogram of body weight reduces the blood pressure substantially.

*Example XII*

A solution containing 17.8 (0.1 mol) of 6-hydroxy-5-methoxy-1-indanone, 19 g. of diethylaminoethyl chloride hydrochloride, 9 g. of sodium hydroxide, 150 ml. of methanol and 100 ml. of water is refluxed for 66 hours. The methanol is distilled under vacuum, and the residue is extracted with ether. Evaporation of the ether and distillation of the residue gives 6-($\beta$-diethylaminoethoxy)-5-methoxy-1-indanone, B. P. 181° C./0.55 mm. The calculated N content for $C_{16}H_{23}NO_3$ is 5.1; that found is 5.1.

The hydrochloride of the compound is prepared by passing hydrogen chloride into an ether solution thereof and recrystallizing from methyl ethyl ketone containing a small amount of methanol. The resulting compound 6 - ($\beta$-diethylaminoethoxy)-5-methoxy-1-indanone hydrochloride, melts at 172–173° C. The calculated N content for $C_{16}H_{24}ClNO_3$ is 4.5; that found is 4.5.

2–4 milligrams of this compound per kilogram of body weight reduces the blood pressure substantially.

*Example XIII*

Following the procedure of Example I using 13.8 g. of 5-hydroxy-1-indanone in place of the 6-hydroxy-1-indanone, results in 5-($\beta$-dimethylaminoethoxy)-1-indanone hydrochloride melting at 210–212° C. The calculated N content for $C_{13}H_{18}ClNO_2$ is 5.5; that found is 5.5.

4–16 milligrams of this compound per kilogram of body weight reduces the blood pressure substantially.

*Example XIV*

Following the procedure of Example XII using 6-hydroxy-2-methyl-1-indanone and $\beta$-dimethylaminoisopropyl chloride hydrochloride, 6-($\beta$-dimethylaminoisopropoxy)-2-methyl-1-indanone is produced. The product is dissolved in ether and treated with hydrogen chloride. The resulting precipitate is removed by filtration and recrystallized from a mixture of methanol and methyl ethyl ketone to provide 6-($\beta$-dimethylaminoisopropoxy)-2-methyl-1-indanone hydrochloride melting at 208–210° C. The calculated N content for $C_{15}H_{22}ClNO_2$ is 4.9; that found is 5.1.

8 milligrams of this compound per kilogram of body weight lowers the blood pressure substantially.

Likewise, using $\beta$-dimethylaminopropyl chloride, $\beta$-dimethylaminobutyl chloride and $\beta$-dimethylaminoisobutyl chloride, in place of $\beta$-dimethylaminoisopropyl chloride, there results 6-($\beta$-dimethylaminopropoxy)-2-methyl-1-indanone, 6-($\beta$-dimethylaminobutoxy)-2-methyl - 1 - indanone and 6 - ($\beta$ - dimethylaminoisobutoxy)-2-methyl-1-indanone respectively.

*Example XV*

Following the procedure of Example I using, however, 7-hydroxy-4-methyl-1-indanone and $\beta$-diethylaminoethyl chloride provides 7-($\beta$-diethylaminoethoxy)-4-methyl-1-indanone hydrochloride melting at 224–226° C. The calculated N content for $C_{16}H_{24}ClNO_2$ is 4.7; that found is 4.8.

In the same manner using 4-hydroxy-7-methyl-1-indanone in place of 7-hydroxy-4-methyl-1-indanone, the corresponding 4 - ($\beta$ - dimethylaminoethoxy)-7-methyl-1-indanone is prepared.

*Example XVI*

Following the procedure of Example I using, however, 6-hydroxy-2-phenyl-1-indanone and $\beta$-diethylaminoethyl chloride results in 6-($\beta$-diethylaminoethoxy)-2-phenyl-1-indanone boiling at 215–217° C./0.1 mm. The calculated N content for $C_{21}H_{25}NO_2$ is 4.3; that found is 4.3.

*Example XVII*

A solution of 7.4 g. of potassium hydroxide in 100 ml. of methanol is added gradually to a solution of 22 g. of 6-hydroxy-2-methyl-1-indanone in 101 g. of ethylene bromide at reflux temperature. The mixture is refluxed five hours, cooled, diluted with water and extracted with chloroform. The chloroform extract is washed with 5 percent sodium hydroxide and water respectively. Evaporation of the solvent and distillation of the residue gives 6-($\beta$-bromoethoxy)-2-methyl-1-indanone, B. P. 140–142° C./0.2 mm., M. P. 71–72° C. The calculated C, H and Br content for $C_{12}H_{13}BrO_2$ is 53.6, 4.9 and 29.7 respectively; that found is 53.7, 4.9 and 29.9.

A solution of 13.5 g. of 6-($\beta$-bromoethoxy)-2-methyl-1-indanone and 60 cc. of 70 percent aqueous ethyl amine in 100 cc. of methanol is heated at 100–125° for 19 hours. The solvent is distilled under vacuum, 10 percent sodium hydroxide is added, and the resulting mixture is extracted with ether. The ether solution is extracted with dilute hydrochloric acid. The hydrochloric acid solution is neutralized with solid potassium carbonate and extracted with ether. Evaporation of the ether and distillation of the residue gives 6-($\beta$-ethylaminoethoxy)-2-methyl-1-indanone, B. P. 150° C./0.47 mm. The calculated N content for $C_{14}H_{19}NO_2$ is 6.0; that found is 6.2.

The hydrochloride of the compound is prepared by passing hydrogen chloride into an ether solution thereof and recrystallization from a mixture of methanol and methyl ethyl ketone, M. P. 217.5–219° C. The calculated N content for $C_{14}H_{20}ClNO_2$ is 5.2; that found is 5.4.

2–8 milligrams of this compound per kilogram of body weight reduces the blood pressure substantially.

Following the same procedure but using methyl amine, propyl amine, isopropyl amine, butyl amine and sec-butyl amine in place of ethyl amine, the corresponding 6-($\beta$-methylaminoethoxy)-2-methyl-1-indanone, 6-($\beta$-propylaminoethoxy)-2-methyl-1-indanone, 6-($\beta$-isopropylaminoethoxy)-2-methyl-1-indanone, 6-($\beta$-butylaminoethoxy)-2-methyl-1-indanone and 6-($\beta$-sec-butylaminoethoxy)-2-methyl-1-indanone are prepared.

*Example XVIII*

To a solution of 5.4 g. of sodium methoxide in 23.4 g. of diethylaminoethanol is added gradually 16.7 g. of 5-chloromethylindan. The mixture is heated on a water bath for 4 hours with occasional shaking. Water is added, and the resulting mixture is extracted with ether. Evaporation of the ether and distillation of the residue gives 5 - ($\beta$ - diethylaminoethoxymethyl)indan, B. P. 108° C./0.15 mm. The calculated N content for $C_{16}H_{25}NO$ is 5.7; that found is 5.6.

1-2 milligrams of this compound per kilogram of body weight reduces the blood pressure substantially.

Example XIX

A mixture of 13.5 g. of 6-($\beta$-bromoethoxy)-2-methyl-1-indanone, 9.3 g. of potassium phthalimide and 200 cc. of n-butyl alcohol is refluxed 18 hours. The solution is cooled and the precipitated solid removed by filtration. Recrystallization from methyl alcohol gives N-[2-(2-methyl-1-oxo-6-indanoxy)ethyl]-phthalimide, melting at 149-150° C. The calculated N content is 4.2; that found is 4.1.

To a suspension of 11 g. of N-[2-(2-methyl-1-oxo-6-indanoxy)ethyl]-phthalimide in 150 cc. of methyl alcohol is added 1.7 g. of hydrazine hydrate. The mixture is heated on a water bath for ½ hour, cooled and treated with 20 cc. of concentrated hydrochloric acid. The resulting mixture is heated on a water bath for 15 minutes, cooled and filtered. The filtrate is concentrated under vacuum, neutralized with 10 percent sodium hydroxide and extracted with ether. After drying the ether solution with anhydrous potassium carbonate, an ether solution of maleic acid is added. The precipitated solid is removed by filtration and recrystallized from methyl ethyl ketone. The resulting 6-($\beta$-aminoethoxy)-2-methyl-1-indanone maleate melts at 157-158° C. The calculated N content is 4.4; that found is 4.3.

Following the same procedure but using 5-($\beta$-bromoethoxy)-1-indanone, 7-($\beta$-bromoethoxy)-1-indanone, 6-($\beta$-bromopropoxy)-1-indanone and 6-($\beta$-bromobutoxy)-1-indanone in place of 6-($\beta$-bromoethoxy)-2-methyl-1-indanone, the corresponding 5-($\beta$-aminoethoxy)-1-indanone, 7-($\beta$-aminoethoxy)-1-indanone, 6-($\beta$-aminopropoxy)-1-indanone and 6-($\beta$-aminobutoxy)-1-indanone are prepared.

Example XX

Following the procedure outlined in Example XVIII using, however, 1-chloro-6-($\beta$-dimethylaminoethoxy)-2-methylindan in place of 1-chlorindan and a solution of sodium ethoxide in ethanol instead of $\beta$-diethylaminoethanol, 6-($\beta$-dimethylaminoethoxy)-1-ethoxy-2-methylindan is prepared.

In a similar manner using, however, a solution of sodium methoxide in methanol, sodium propoxide in propanol, sodium isopropoxide in isopropanol, sodium butoxide in butanol and sodium sec-butoxide in sec-butanol, the corresponding 6-($\beta$-dimethylaminoethoxy)-1-methoxy-2-methylindan, 6-($\beta$-dimethylaminoethoxy)-1-propoxy-2-methylindan, 6-($\beta$-dimethylaminoethoxy)-1-isopropoxy-2-methylindan, 6-($\beta$-dimethylaminoethoxy)-1-butoxy-2-methylindan and 6-($\beta$-dimethylaminoethoxy)-1-sec-butoxy-2-methylindan are prepared.

Example XXI

Following the procedure outlined in Example XII using, however, 4,5-dihydroxy-1-indanone in place of 6-hydroxy-5-methoxy-1-indanone, the corresponding 5-($\beta$-diethylaminoethoxy)-4-hydroxy-1-indanone is prepared.

I claim:
1. Oxygenated indan compounds having the fundamental structural formula:

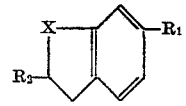

where $R_1$ is a dialkylaminoalkoxy group the alkyl and alkoxy groups of which contain from 1 to 4 carbon atoms; where $R_2$ is selected from the group consisting of hydrogen and alkyl groups containing from 1 to 4 carbon atoms and where X is selected from the group consisting of $$-\overset{O}{\underset{}{C}}-, \quad -\overset{OH}{\underset{}{C}H}-$$

and

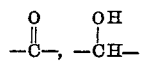

where $R_4$ is an alkyl group containing from 1 to 4 carbon atoms.

2. Oxygenated indan compounds having the fundamental structural formula:

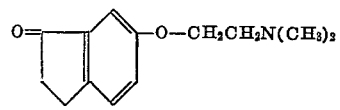

3. Oxygenated indan compounds having the fundamental structural formula:

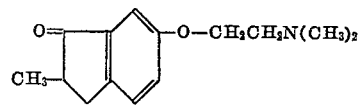

4. Oxygenated indan compounds having the fundamental structural formula:

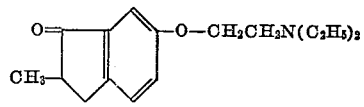

5. Oxygenated indan compounds having the fundamental structural formula:

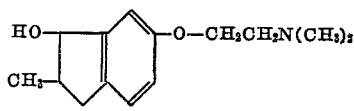

6. Oxygenated indan compounds having the fundamental structural formula:

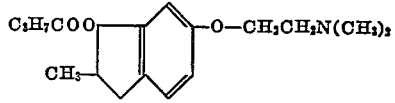

References Cited in the file of this patent
Protiva et al.: "Chem. Abst." (1952), vol. 46, page 8082.